United States Patent
Brique et al.

(10) Patent No.: US 8,522,028 B2
(45) Date of Patent: Aug. 27, 2013

(54) METHOD FOR SECURE DATA EXCHANGE BETWEEN TWO DEVICES

(75) Inventors: Olivier Brique, Le Mont-sur-Lausanne (CH); Christophe Nicolas, Préverenges (CH); Marco Sasselli, Chardonne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 881 days.

(21) Appl. No.: 10/517,428

(22) PCT Filed: Jun. 10, 2003

(86) PCT No.: PCT/IB03/02425
§ 371 (c)(1),
(2), (4) Date: Apr. 5, 2006

(87) PCT Pub. No.: WO03/107585
PCT Pub. Date: Dec. 24, 2003

(65) Prior Publication Data
US 2006/0190726 A1   Aug. 24, 2006

(30) Foreign Application Priority Data

Jun. 12, 2002 (CH) .................................. 1002/02

(51) Int. Cl.
*H04L 9/32* (2006.01)
(52) U.S. Cl.
USPC ........... 713/171; 713/168; 713/169; 713/170; 380/45; 380/46; 380/47; 380/277; 380/278; 380/281; 380/284; 380/285; 709/228; 709/237; 726/2; 726/21
(58) Field of Classification Search
USPC ........................................................ 713/171
See application file for complete search history.

(56) References Cited

U.S. PATENT DOCUMENTS 5,225,664 A * 7/1993 Iijima ........................... 235/380
5,371,794 A   12/1994 Diffie et al.
(Continued)

FOREIGN PATENT DOCUMENTS

EP   0 537 971   10/1992
TW   484292     4/2002
(Continued)

OTHER PUBLICATIONS

Taiwan Search Report dated Jan. 21, 2009.

*Primary Examiner* — Nathan Flynn
*Assistant Examiner* — Bryan Wright
(74) *Attorney, Agent, or Firm* — Harness, Dickey & Pierce, P.L.C.

(57) ABSTRACT

This invention concerns a safe data exchange method between two devices locally connected to one another.
In a preferred embodiment, the first device (10) is a security module containing a first encrypting key, said private key (PAKV) of a pair of asymmetric encrypting keys. The second device is a receiver (11) comprising at least one second encrypting key, said public key (PAKB) of said pair of asymmetric encrypting keys. Furthermore each of the devices comprises a symmetrical key (13). The first device (10) generates a first random number (A), which is encrypted by said private key (PAKV), then transmitted to the second device (11), in which it is decrypted by means of the public key (PAKB). The second device (11) generates a second random number (B), which is encrypted by said public key (PAKB), then transmitted to the first device (10), in which it is decrypted by means of the private key (PAKV). A session key (SK), used for safe data exchange, is generated by a combination of the symmetric key (13) and the random numbers (A, B) generated and received by each of the devices.

19 Claims, 2 Drawing Sheets

(56) References Cited

U.S. PATENT DOCUMENTS

| | | | |
|---|---|---|---|
| 6,058,476 A * | 5/2000 | Matsuzaki et al. | 713/169 |
| 6,507,907 B1 * | 1/2003 | Takahashi et al. | 713/150 |
| 7,031,470 B1 * | 4/2006 | Bar-On | 380/203 |
| 2003/0026428 A1 * | 2/2003 | Loisel | 380/277 |
| 2004/0005061 A1 * | 1/2004 | Buer et al. | 380/282 |
| 2004/0250073 A1 * | 12/2004 | Cukier et al. | 713/171 |

FOREIGN PATENT DOCUMENTS

| | | |
|---|---|---|
| WO | WO 97/38530 A | 10/1997 |
| WO | WO 00/30319 | 5/2000 |

* cited by examiner

METHOD FOR SECURE DATA EXCHANGE BETWEEN TWO DEVICES

This invention concerns a safe data exchange method between two devices locally connected to each other, especially between a receiver and a security module.

It also concerns a receiver designed for implementing the method according to the invention.

Currently safe methods exist allowing data to be exchanged between two devices such as a receiver and a security module, for example in the domain of pay-TV.

Such a method is especially described in the international patent application published under No. WO 97/38530. According to this method, the receiver contains a public asymmetric encrypting key and the security module contains the corresponding private asymmetric encrypting key. At the time of initialising the method, that is to say for example when the security module is inserted into the receiver, the receiver generates a random number A and a random key Ci. The two random elements are encrypted by the receiver's public key, and are then sent, to the security module in the encrypted form.

The random number and the random key are then decrypted by means of the private key.

According to a particular embodiment, the random number A, decrypted by the private key, can then be encrypted in the security module by means of the random key Ci, and transferred to the receiver, then decrypted in the receiver by means of the same initially generated random key. The random number A' obtained at this stage is compared to A, the one generated by the receiver in order to verify that the security module corresponds well to the one which must be used with the receiver. When another security module is used with this receiver, the two random numbers A and A' will not correspond and the communication is interrupted. If the security module and the receiver are recognized as being able to exchange data with each other, the random key Ci is used as a session key, that is to say that all the data exchanged in the safe form between the security module and the receiver during a given session, for example till the security module is withdrawn, is encrypted by means of this random key.

This form of execution presents drawbacks regarding security. In fact, the receiver is not considered to be a reliable element, unlike the security module and it is possible to determine the public key of a receiver thanks to technical means and computer analysis. It is therefore possible to modify a receiver in such a way that it generates a predetermined key in place of a random key Ci.

In this case, the verification of the communication with the security module will be carried out with a predetermined key.

In this way, the "random" key Ci being known, the messages can be decrypted and, in the case of pay-TV in particular, the data necessary for the system to work, especially the <<Control Words>> can be decrypted and made available to third parties, for example using an network such as Internet. It should be noted that the random key Ci is a symmetrical key.

When it is known, either because it has been predefined, or because it has been obtained in another way, it can be used to decipher messages originating from the receiver and those coming from the security module at the same time.

This invention proposes avoiding this drawback by offering a process of safe data transfer between a receiver and a security module thanks to which the decrypting of unauthorized data is particularly complex.

This aim is achieved by a safe data exchange method between two devices locally connected to each other, especially between a security module and a receiver, the first device comprising at least one first encrypting key of a pair of asymmetric encrypting keys and the second device comprising at least one second encrypting key of said pair of asymmetric encrypting keys, these keys being previously initialised in the first and second device, this method including the steps consisting of:

generating, at least one first random number in the first device, generating, at least one second random number in the second device, encrypting said first random number by said first encrypting key, encrypting said second random number by said second encrypting key, transmitting said first random number encrypted to the second device, transmitting said second random number encrypted to the first device, decrypting, in said second device, the first encrypted random number, decrypting, in said first device, the second encrypted random number, combining said random numbers generated by one of the devices and received by the other device to generate a session key, and using the session key to encrypt all or part of the exchanged data between the first and second device.

This invention and its advantages will be better understood with reference to different particular embodiments of the invention and to attached drawings, in which.

Figure 3:
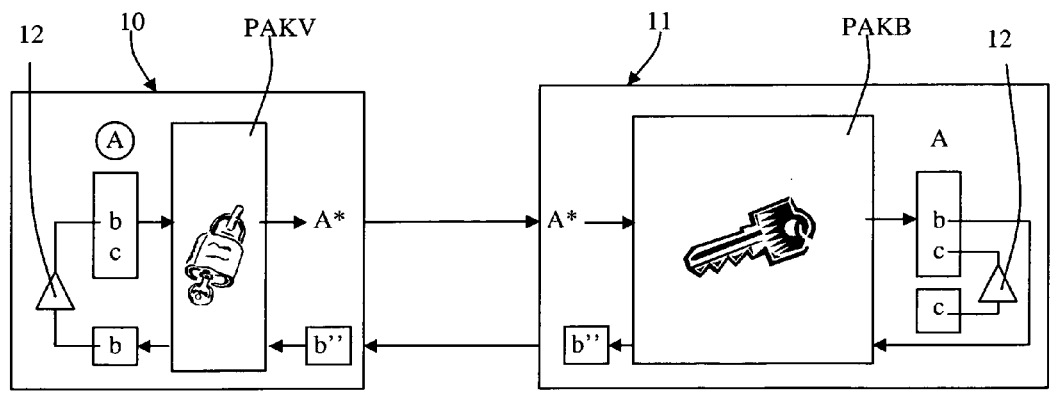
Figure 4:
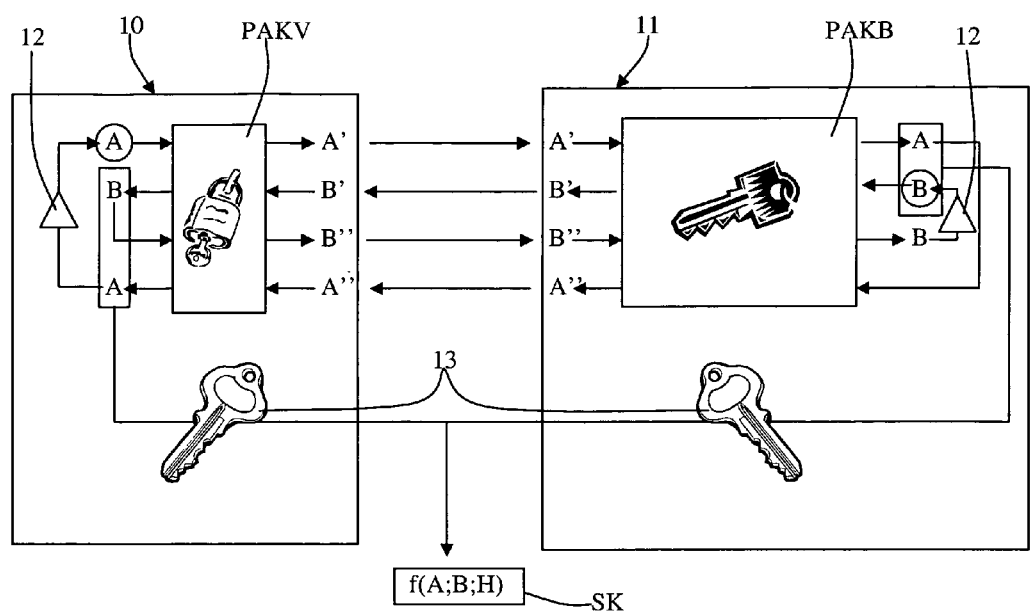

FIG. 3 schematically shows a kind of number structure such as that used in the method according to the invention, and FIG. 4 represents a third embodiment of this invention.

With reference to these figures, reference 10 schematically represents, a security module and reference 11, a receiver.

The security module 10 and the receiver 11 are jointly denominated the devices in the rest of the text. As the expert knows, the security module 10 can especially be in the form of a microchip card or a module containing a chip such as a connector known by the denomination <<dongle>>. It is clear that other embodiments could be imagined without leaving the scope of this invention.

This security module 10 contains a private asymmetric key PAKV of a pair of asymmetric keys. This key can be introduced into the security module 10 for example at the time the module is manufactured or at a further stage, in a managing data centre or thanks to a secure connection between said managing centre and the security module. It is stored in a non-volatile memory of the module.

The receiver 11, in particular in the case of paying TV, is generally formed by a box connected to the television set. It contains a public asymmetric key PAKB coming from said pair of asymmetric keys. This public key is thus matched to the private key of the security module. The public key is generally programmed at the manufacture of the receiver or during an initialisation phase in a protected environment. It can also be safely remotely loaded by broadcasting.

In the domain of pay-TV especially, it is desirable that only one receiver operates with only one security module. This allows avoiding that rights loaded in a security module belonging to a given owner be used in several receivers belonging to other owners. For this reason, the security module and the receiver are matched in such a way that only one security module can only function with only one receiver and conversely. This matching is done thanks to the pair of asymmetric keys of which one is loaded in the security module and of which the other is loaded in the receiver. In principle, the pairs of asymmetric keys are unique. However, in practice, when the users' number is very high, it is possible to attribute the same pair of keys several times, keeping very low the possibility that rights are exchanged. This risk can be set to zero by using a unique supplementary symmetric key, as is explained below referring to FIG. 4.

In the embodiment disclosed in FIG. 1, the process of the invention takes place in the following way: when a communication between the two devices, namely the security module 10 and the receiver 11 is initiated, the security module first of all generates a random number A. This is represented surrounded by a circle in FIG. 1. This random number is encrypted in the security module 10 by the private key PAKV, in such a way as to obtain a random encrypted number A' (A'=PAKV(A)). This is transmitted to the receiver 11. The random number encrypted A' is decrypted in the receiver by means of the public key PAKB, which allows one to obtain the initial random number A.

Figure 1:
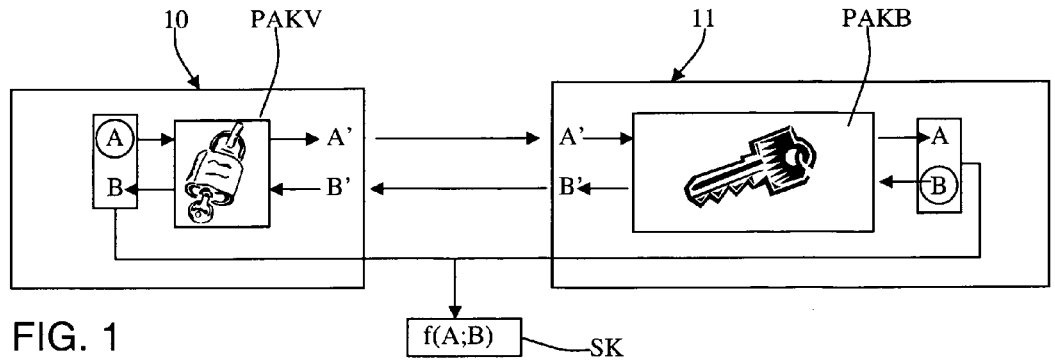
FIG. 1 represents a first embodiment of this invention.

Inversely, the receiver 11 generates a random number B, represented surrounded by a circle in FIG. 1. This random number B is encrypted in the receiver using the public key PAKB. One obtains thus a random encrypted number B' (B'=PAKB(B)), which is transmitted to the security module 10. The random number encrypted B' is decrypted in the security module by means of the private key PAKV, which allows to obtain the initial random number B.

In this way, either the security module or the receiver dispose of random number A generated by the security module and random number B generated by the receiver. These two random numbers are combined in such a way as to generate new random number, which will be used, in a first embodiment as a session key SK. The combination can be carried out by a simple concatenation of two numbers, by a function OR EXCLUSIVE or by every other suitable combination.

The session key SK thus generated is used for all the security communications between the security module and the receiver.

This embodiment offers great security to the user since it is reputed to be impossible to know the private key contained in the security module. If it is possible to impose a determined number in place of the random number B in the receiver, however it is not possible to impose a random number A in the security module.

In a similar way, by sophisticated technical means, one can determine the public key PAKB, but one cannot deduce the private key PAKV. Therefore, the fact that each of the devices generates a random number and that these numbers are encrypted with asymmetric keys, prevents deceiving the device by imposing the keys and the random numbers.

Figure 2:
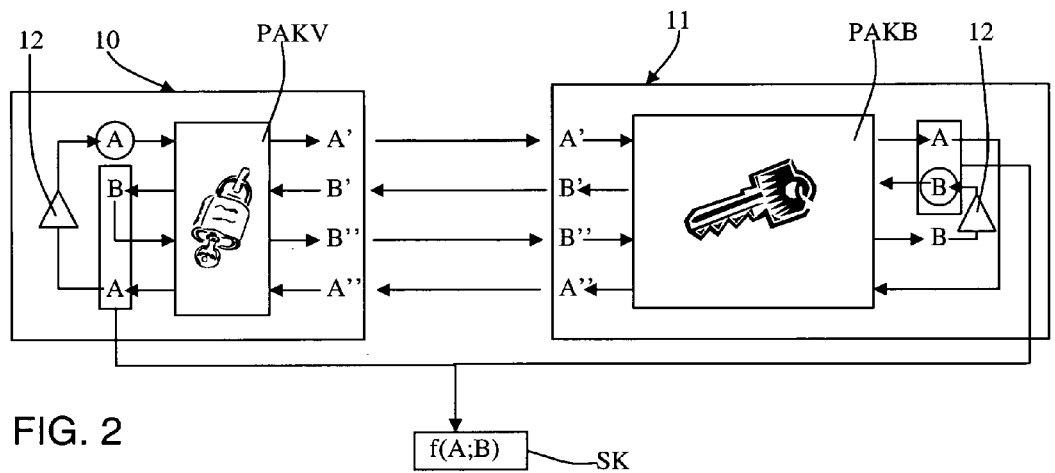
FIG. 2 shows a second embodiment of the invention.

In the embodiment according to FIG. 2, as in that of FIG. 1, a random number is generated by each of the devices. It is encrypted by the corresponding key and transmitted to the other device in the encrypted form.

The random number A received by the receiver 11 is then encrypted again, this time by the public key PAKB of the receiver, in such a way as to obtain a new encrypted number A" (A"=PAKB(A)) which is sent to the security module 10.

It is decrypted there thanks to the private key PAKV. If the private keys PAKV and the public keys PAKB used respectively in the security module 10 and in the receiver 11 are matched, number A thus obtained is identical to random number A of origin generated by the security module. As described referring to FIG. 2, the method has a comparison stage 12 between the random number A coming from the decrypting of number A" encrypted in the receiver 11 and random number A generated by the security module 10. If these numbers are not identical, one can deduce that the security module is not matched to the receiver and that the communications or the data transfers must be interrupted. This can happen for example when a security module is introduced in a receiver different to that for which it has been matched or when a security module is simulated for example by means of a computer.

Similarly, random number B received by the security module 10 is also encrypted by the private key PAKV of this module, in such a way as to obtain a encrypted number B" (B"=PAKV(B)).

This is sent to the receiver 11, in which it is decrypted by means of the public key PAKB. Thus a random number B is obtained which is compared to the random number B of origin generated by the receiver 11. As previously, the two random numbers are compared in a comparison stage 12. If these two random numbers are not identical, the communication is interrupted.

If the comparison of the random numbers gives a positive result, that is to say if the security module 10 and the receiver 11 are matched, a session key SK is generated by using a combination of the random numbers A and B. This session key is used for further security communications between the security module and the receiver.

This embodiment presents the advantage that the random numbers before and after encrypting are compared by both the security module 10 and the receiver 11. In this way, even if a third person appropriates the public key of the receiver, these cannot be used to decrypt the exchanged messages between the security module and the receiver. Likewise, if a security module is used on a receiver for which it is not anticipated, the data will not be able to be decrypted.

In the method according to FIG. 3, to the random number as previously described is added, for example the random number A as described referring to FIGS. 1 and 2, two parts b and c each having a built-in function. b is a random number generated in the security module 10. c is a fixed preset number, called "pattern", which is memorized in the security module 10 and in the receiver 11. This pattern can for example be formed from a sequence of 0 and 1 alternated.

According to a first embodiment, the three elements, namely the random number A, the random number b and the pattern c are encrypted by means of the private key PAKV. One obtains thus a number A- such that A-=PAKV (A, b, c). This number A- is transmitted to the receiver 11, in which it is decrypted by means of the public key PAKB. This decrypting must result in the three numbers A, b and c if the security module 10 and the receiver 11 are matched. As number c has a preset known value, the receiver can easily carry out a verification of this value. For that purpose, the receiver carries out a comparison between the value of c memorized in the receiver and that obtained after decrypting. If these two values are not identical, the data exchange with the security module is stopped.

Random number b is sent back to the security module 10 for verification. Because of this, first of all it is encrypted in the receiver 11 by means of the public key PAKB, which gives the number b" (b"=PAKB(b)). This number b" is then sent to the security module 10 in which it is decrypted thanks to the private key PAKV. The number thus decrypted is compared to the initial number b and the data exchange is interrupted if these two numbers are not identical.

According to a second embodiment, the three elements, namely the random number A, the random number b and the pattern are separately encrypted in the security module 10 by means of the private key PAKV.

One then obtains three encrypted numbers. At the time of decrypting, if the security module and the receiver are matched, one obtains the random numbers A and b, as well as the pattern c, as previously.

The session key SK is formed from a combination according to a known rule, random number A generated by the security module 10, random number B generated by the receiver and possibly random number b generated by the security module and/or pattern c.

As all these elements are known either by the security module 10 or by the receiver 11, the session key can be formed.

This embodiment is advantageous to different points of view.

On the one hand, it allows one to carry out a first verification of the matching of the security module 10 and of the receiver 11 thanks to pattern c, using a unidirectional communication between the two devices. When the devices are not matched, it is desirable to carry out as few data exchanges as possible, which is done thanks to the verification of the contents of pattern c.

On the other hand, by sending the random number b back, it is possible to verify the matching between these two devices, certainly and reliably, without however transmitting the random number A twice. This improves the security of the data exchanges even more since one minimises the quantity of confidential data that are exchanged between the two devices.

It should be noted that one can also add only a pattern c to the random number A. The verification of the matching between the two devices is only done when there is pattern c. In a similar way, one can also add only another random number b, without pattern c to the random number A, the verification being made in the security module 10, on the random number b.

In the embodiment disclosed in FIG. 4, the first steps of the method take place in the same way as in the one disclosed in FIG. 2. Random numbers A and B are generated respectively by the security module 10 and by the receiver 11. They are exchanged and verified in such a way that assures that the security module 10 and the receiver 11 are well matched. In this embodiment, the security module and the receiver dispose furthermore of a symmetric key PHK, carrying the reference 13. The random numbers A and B are not simply combined to each other to obtain a session key SK, as in the embodiment of FIG. 2, but they are also combined with the symmetric key 13. The combination of these three elements can be done as previously, by concatenation or by every other suitable function. According to a particular form of the invention, the session key SK is formed by encrypting the two concatenated numbers A and B (SK=PHK (A, B)) with the symmetrical key 13.

This presents the advantage of making the unauthorized decrypting of messages more difficult and obliges one to dispose of all the keys to be able to obtain a usable piece of information. The security of the device is thus still reinforced. This embodiment is also advantageous because it is relatively long and difficult to generate a very large quantity of pairs of different asymmetric keys. For simplification, faced with a very large number of users, it is desirable to assign the same pair of keys to several couples of security module/receiver.

On the other hand, the symmetrical key is unique. So, using a symmetrical key in other keys, it is possible to guarantee that a security module is only usable with the corresponding receiver.

It is possible to memorize the session key generated for example during the first use of the device and to always use this key.

However, for security reasons, it is advisable to generate a new key every time a new session is begun, a session being defined as the period separating the start and the finish of the data exchanges between the two devices. In order to increase the communications' security even more, it is even possible to change the key according to chosen intervals, for example regular ones or according to a defined algorithm, during a same session, for example every two hours. So, all the data that could have been obtained without authorisation can no longer be used after this maximum validity duration of the session key.

According to a particular embodiment of the invention, one can use a "smart" security module or similar means, which allow one to measure different physical parameters, such as especially line impedance or electric consumption. The value of this or of these parameters is compared, at regular intervals, to a reference value. When one notices a difference, beyond a tolerance level, between these compared values, one can deduce that an unidentical reading risk exists of data on the system. In this case, one can, although it will not be a preferred solution, cut the whole data exchange between the receiver and the security module. A preferred solution consists of sending a request to the receiver, asking the generation for a new session key. The data exchange is blocked if the receiver does not comply. This allows one to obtain a dynamic system in which every access attempt to confidential data is watched. The measurement of the physical parameters can also be implanted in the receiver.

As is known by the expert, a receiver for pay-TV essentially includes a processing unit, a read-only memory, a demultiplexer, a descrambler, a digital/analogical converter, an external memory and a sound and image decrambler. In the present systems, the processing unit, the read-only memory and the descrambler can be contained in a same electronic chip. In the systems of the prior art, the public key PAKB is generally contained in the external memory. This one is accessible; thereby it is possible to read or to modify its contents, which can create risk of reading unauthorized data.

In order to minimise this risk, the public key PAKB and/or the symmetrical key 13 can advantageously be stored either in the read-only memory, or in the descrambler. This greatly increases security, because, to modify one of the keys, it is indispensable to change the electronic chip, which is not very interesting from an economical point of view and which implies that one can provide counterfeit chips. The security of the communications is thus particularly effective.

It should be noted that, in the description that follows, the key carrying the reference 13 in FIG. 4 is described as being a symmetric key. It is however also possible to use a pair of asymmetric keys in place of this symmetric key. In this case, one uses two pairs of asymmetric keys. One of the pairs of keys can be common for a users' group and the other can be unique. The two pairs can also be unique.

In the description of the examples above, the first device corresponds to the security module and the second device corresponds to the receiver. It is clear that the method according to the invention operates in the same way if the first device is the receiver and the second device is the security module.

The invention claimed is:

1. Data exchange method between two devices locally connected to one another, a first device of the two devices being a security module and a second device of the two devices being a receiver, the first device comprising at least one first encrypting key of a pair of asymmetric keys and the second device comprising at least the second encrypting key of said pair of asymmetric keys, this method comprising:

generating, at least one first random number in the first device, generating, at least one second random number in the second device, encrypting said first random number by said first encrypting key, the first encrypting key initialized in the first device during an initialization phase of the first device in a first protected environment, encrypting said second random number by said second encrypting key, the second encrypting key initialized in the second device during an initialization phase of the second device in a second protected environment, transmitting said first encrypted random number to the second device, transmitting said second encrypted random number to the first device, decrypting the first encrypted random number in said second device, decrypting the second encrypted random number in said first device, combining said random numbers generated by one of the devices and received by the other device to generate a session key, and using the session key to encrypt and decrypt all or part of the exchanged data between the first and second device wherein at least one of the two devices measures at least one representative physical parameter of the communication, the at least one representative physical parameter including at least one of a line impedance and an electric consumption, wherein at least one of the two devices compares the values measured to reference values, and wherein at least one of the two devices acts on the data exchange when the measured parameters differ from the reference values more than a threshold value.

2. Data exchange method according to claim 1, wherein the first encrypted random number, transmitted to the second device and decrypted by the second device is encrypted by said second device by means of said second encrypting key, transmitted in an encrypted form to said first device, decrypted in the first device by means of the first encrypting key and compared to said first random number previously generated by the first device, and wherein a data transfer between the first and second devices is stopped if the compared random numbers are not identical.

3. Data exchange method according to claim 1, wherein the second random number, transmitted to the first device and decrypted in the first device is encrypted by said first device by means of said first encrypting key, transmitted in an encrypted form to said second device, decrypted in the second device by means of the second encrypting key and compared to said second random number previously generated by the second device, and wherein a data transfer between the first and second devices is stopped if the compared random numbers are not identical.

4. Data exchange method according to claim 1, in which said first device and said second device contain a symmetric encrypting key, wherein the random numbers are combined with said symmetric key to generate the session key.

5. Data exchange method according to claim 1, wherein the combination of said random numbers is a concatenation.

6. Data exchange method according to claim 4, wherein the combination of said random numbers is a concatenation.

7. Data exchange method according to claim 1, wherein the session key is regenerated in function of a determined parameter of use.

8. Data exchange method according to claim 7, wherein the determined parameter of use is the duration of use.

9. Data exchange method according to claim 1, wherein at least one of the two devices acts by stopping the data exchange between the two devices.

10. Data exchange method according to claim 1, wherein the session key is regenerated in function of a determined parameter of use and wherein the determined parameter of use is the representative physical parameter of the communication.

11. Data exchange method according to claim 1, wherein at least one of the devices generates at least one supplementary random number, this supplementary random number is encrypted by said first encrypting key, this supplementary encrypted random number is transmitted to the second device, this transmitted encrypted supplementary random number is decrypted in this second device, the decrypted supplementary random number is encrypted by said second encrypting key, the supplementary encrypted random number is transmitted to the first device, the supplementary random number decrypted in the first device is compared to the initial supplementary random number generated in said first device, the information exchange is interrupted if the comparison indicates that the two compared numbers are not identical.

12. Data exchange method according to claim 1, wherein at least one of the devices determines at least one predefined fixed number memorized in the two devices, this predefined fixed number is encrypted by said first encrypting key, this predefined fixed encrypted number is transmitted to the second device, this transmitted encrypted predefined fixed number is decrypted in this second device, the predefined fixed number decrypted in the second device is compared to the predefined fixed number memorized in this second device, the data exchange is interrupted if the comparison indicates that the two compared numbers are not identical.

13. Data exchange method according to claim 11, wherein each of the numbers is encrypted separately.

14. Data exchange method according to claim 12, wherein each of the numbers is encrypted separately.

15. Data exchange method according to claim 11, wherein a combination of each of the numbers is encrypted.

16. Data exchange method according to claim 12, wherein a combination of each of the numbers is encrypted.

17. Receiver for carrying out the method according to claim 1, this receiver comprising at least one calculation unit, a read-only memory, a demultiplexer, a descrambler, a digital/analog converter, an external memory and a sound and image descrambler, wherein at least the calculation unit, the read-only memory and the descrambler are contained in a same electronic chip and wherein at least one of the encrypting keys is stored in said electronic chip.

18. Receiver according to claim 17, wherein at least one of the numbers is stored in said electronic chip.

19. A data exchange method between a security module locally connected to a receiver, the security module including a first encrypting key of a pair of asymmetric keys and the receiver including a second encrypting key of said pair of asymmetric keys, the method comprising:

generating, at least one first random number in the security module, generating, at least one second random number in the receiver, encrypting said first random number by said first encrypting key, the first encrypting key initialized in the security module during an initialization phase of the security module in a first protected environment, encrypting said second random number by said second encrypting key, the second encrypting key initialized in the receiver during an initialization phase of the receiver in a second protected environment, transmitting said encrypted first random number to the receiver, transmitting said encrypted second random number to the security module, decrypting the encrypted first random number in the receiver, decrypting the encrypted second random number in the security module, combining the decrypted second random number with the first random number generated in the security module, and combining the decrypted first random number with the second random number generated in the receiver, said combinations generating a session key in the security module and the receiver, and using the session key to encrypt and decrypt at least a portion of data exchanged between the security module and receiver, wherein the encrypted first random number, transmitted to the receiver and decrypted by the receiver, is
encrypted by the receiver using the second encrypting key,
transmitted in an encrypted form to the security module,
decrypted in the security module using the first encrypting key, and
compared with the first random number previously generated in the security module, and a data transfer between the security module and the receiver is stopped if the compared random numbers are not identical, and wherein at least one of the two devices measures at least one representative physical parameter of the communication, the at least one representative physical parameter including at least one of a line impedance and an electric consumption, wherein at least one of the two devices compares the values measured to reference values, and wherein at least one of the two devices acts on the data exchange when the measured parameters differ from the reference values more than a threshold value.

\* \* \* \* \*